Sept. 17, 1940.                    B. NICHOLAS                    2,215,050
       MACHINE FOR TREATING RAMIE GRASS TO LIBERATE AND CLEAN THE FIBERS
                    Filed Nov. 15, 1939            3 Sheets-Sheet 1
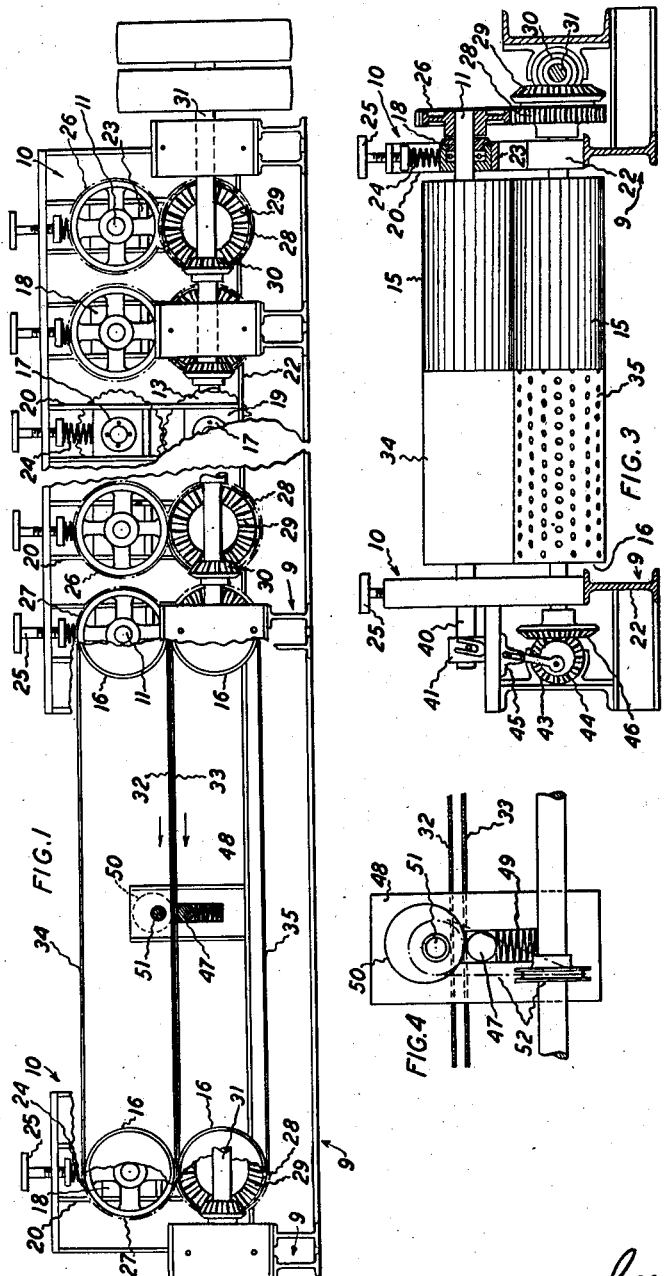
Inventor:
B. Nicholas

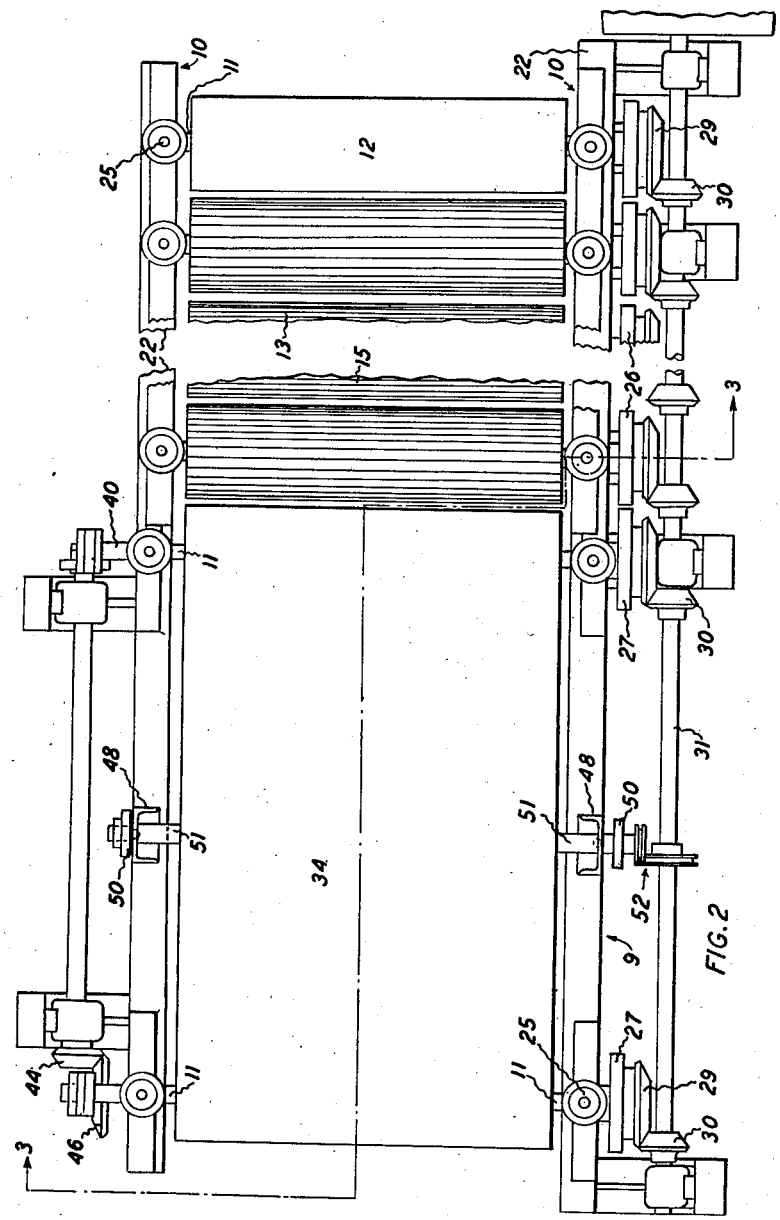

Sept. 17, 1940. B. NICHOLAS 2,215,050
MACHINE FOR TREATING RAMIE GRASS TO LIBERATE AND CLEAN THE FIBERS
Filed Nov. 15, 1939 3 Sheets-Sheet 3

Patented Sept. 17, 1940

2,215,050

UNITED STATES PATENT OFFICE 2,215,050

MACHINE FOR TREATING RAMIE GRASS TO LIBERATE AND CLEAN THE FIBERS

Balda Nicholas, Bellevue Hill, near Sydney, New South Wales, Australia

Application November 15, 1939, Serial No. 304,593
In Australia October 5, 1938

9 Claims. (Cl. 19—12)

This invention consists in apparatus for decorticating ramie grass, which operation comprises the release and removal of the boon and woody matter from the fibers to liberate them for after-processing operations.

The machine comprises a gang of paired rollers on parallel spindles all geared to a primary drive shaft for concerted rotation by a prime mover; the first pair of these rollers in the gang is smooth surfaced and the following rollers are longitudinally fluted or toothed, with the teeth of each pair in intermeshed relation but not contacting; then follow in alignment with the before-mentioned rollers two pairs of smooth rollers which function as pulleys for a pair of endless belts, which between them carry the grass which, in passing between the corrugate rollers, has been crushed and subjected to rubbing action. One of these carrier belts is driven slightly faster than the other carrier belt, and the belts are repeatedly "clapped" by means of a rapidly vibrating bar; transverse vibration is continuously applied to one of them. These clapping and vibrating movements are applied during its progression movement, so as thereby to effect a final loosening and release of the fiber from the associated unwanted matter which is clinging to it. One or both of the belts may be perforated at intervals to facilitate release of the separated finely broken up unwanted matter. This separation may be further facilitated by subjecting the grass in movement between the belts to a winnowing air blast.

In the accompanying drawings:

Fig. 1 is a side elevation of the machine, with parts shown broken away;

Fig. 2 is a corresponding plan (broken in length);

Fig. 3 is a transverse section on line 3—3 in Fig. 2;

Fig. 4 is a fragmentary detail showing the two carrier belts and the means for vibrating them in vertical direction;

Figure 5:
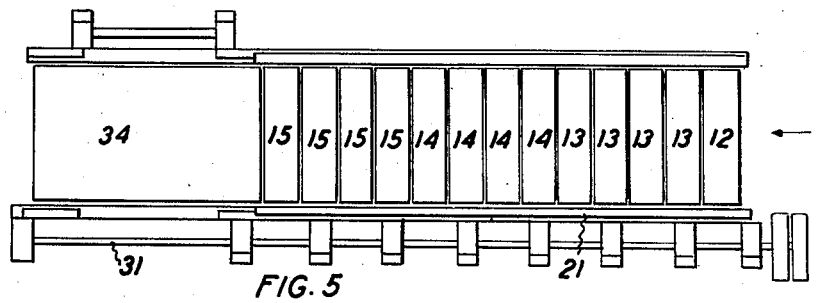
Fig. 5 is a diagrammatic outline plan of the entire machine on a reduced scale.

9 is a bed on which side frames 10 are built; these frames are furnished with bearings 17 for the spindle journals 11 of the rollers. The roller journals have their bearings in blocks 18 and 19 which are vertically movable in guides 20. The blocks 18 rest on cross bars 23 and are resiliently held thereon by loading springs 24, the pressure whereof is adjustable by hand wheel operated screws 25. The blocks 19 rest on the upper surface 22 of the bed 9.

The upper rollers in each pair thereof are rotated by spur gears 26, 27, which mesh with spur gears 28 which are keyed on the spindles of bevel wheels 29; the bevel wheels 29 are driven by bevel pinions 30 which are keyed on a drive shaft 31 to which primary drive is applied.

The pair of rollers 12 at the entry end of the machine are smooth surfaced; they function to feed in and longitudinally split grass stems which have been previously dried and introduced between them. From the entry rollers 12, the grass stems pass on between the pairs of corrugate-surface crushing rollers 13, 14 and 15; thence they pass on between the conveyer belts 34 and 35. Intermediate the pairs of conveyer belt pulley rollers, the conveyer belts are clapped together in passing over a vibrating bar. Air jets (not shown) may be directed between the belts where they pass over the pulleys.

Figure 6:
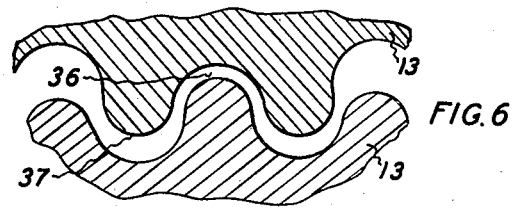
Figs. 6, 7, and 8 are fragmentary sections through the intermeshing flutings on the upper and lower crushing rollers.
Figure 7:
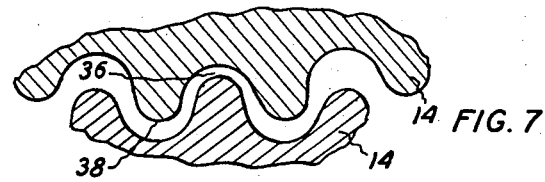
Figure 8:
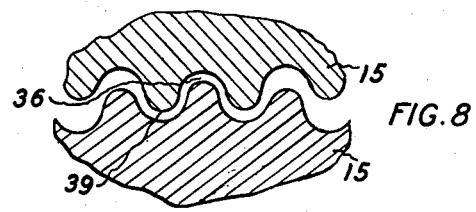

Effectiveness of the decorticating operation is best attained by maintaining a minimum clearance (36) of about ¼ inch between the opposing faces of the corrugated intermeshing rollers, constant throughout the gang, and by progressively reducing the pitch of the teeth in successive pairs of the rollers in the direction of progressive movement of the grass stems through the machine. In practice this pitch variation (see Figs. 5 to 8) is such that the rollers 13 have teeth 37 spaced on a coarse pitch (for example, 2½") the rollers 14 have teeth 38 spaced to a pitch of 2", and the pitch of the teeth 39 of the rollers 15 is 1¼".

The pulley rollers 16 are smooth surfaced and carry the pair of continuous conveyer belts 34 and 35. The peripheral speeds of the rollers 12 to 15 and of the conveyer 35 are all equal and are in practice about 145 to 300 feet per minute.

In order to produce a rubbing action on the grass between the belts 34 and 35, the belt 34 is travelled slightly faster than belt 35, and the two belts are repeatedly clapped together by the vertical vibration of the spring cushioned bar 47. The greater linear speed of the belt 34 (which speed may be five per cent. greater than that of the belt 35) is obtained by appropriately varying the ratio of the gearing which drives the pulley rollers. Transverse reciprocation of the belt 34 is effected by extending the journals 11 of the two upper pulley rollers 16, as indicated at 40, and fitting thereon axially immovable but freely revolvable collars 41 fork-coupled to levers 43, which are crank-connected to bevel pinions 44 and slot fulcrumed at 45. The gears 44 mesh with bevel gears 46 which are keyed on the journals 11 of the lower rollers 16.

The belt 35 is closely perforated as shown in Fig. 3 in order to promote "get-away" of unwanted material; get-away is aided by the clapping movement of the belts. The pulley rollers 16 are set normally to provide a slight clearance (of, say ⅛ of an inch) between the contacting faces of belts 34 and 35. The belts, however, tend to sag; this sag is taken up by the bar 47, which underlies the top flight of the belt 35. 48 are guides which retain the bar 47 in working alignment. The bar 47 rests on springs 49. The eccentrics or cams 50 are keyed on the ends of a shaft 51 which is belt driven from, or is geared to the drive shaft 31, as indicated at 52 in Figs. 2 and 4.

In operation, the drive shaft 31 has motion applied to it from any source of power, and through the intermediate gears the described system of rollers is driven through spur gearing. The grass stems are taken into the machine through the primary smooth rollers 12, and suffer a certain amount of crushing in going between those rollers, thence they pass successively through the pairs of rollers 13, 14, 15 (see Fig. 5) and thence go between the lower flight 32 of the upper conveyer and the upper flight 33 of the lower conveyer. In passing through the corrugated rolls, the stems are crushed and repeatedly bent, the bends being at closer intervals as the stems pass from the nip rollers 12 to the belts. In passing between the belts, the belt flights 32 and 33 are clapped together, causing dust and small detached matter to drop clear, and lateral rubbing is applied to the stems by the transverse reciprocating movement applied to one of the belts. The fibers thus mechanically treated pass out from between the end pulley rollers 16 to a receiver and thence go for further treatment.

Although this apparatus is primarily directed to the decortication of ramie grasses, it is applicable also for the treatment of many other fiber grasses or stems or leaves, and the term "ramie" grass as used herein, and in the following claims, is intended to be construed to include such other fibrous materials.

What is claimed is:

1. Apparatus for decorticating ramie grass, comprising a pair of feed-in rollers, a gang of pairs of intermeshing non-contacting toothed crushing rollers in operative delivery alignment therewith, said crushing rollers having the tooth pitches progressively reduced towards one end of the series thereof, the gang of rollers crushing the stems of the grass passing therethrough, a pair of continuous flexible belts in operative alignment with said toothed rollers, for receiving the crushed stems of the grass, one of said belts being perforate, means for driving all said rollers and said belts, means for applying reciprocating movements to one of said belts across the direction of its movement, and means for imparting a vertical clapping motion to one said belt, towards and away from the other, to subject the grass stems to a combination of transverse rubbing action and vertical clapping action while passing between adjacent flights of the continuously moving belts.

2. Apparatus for decorticating ramie grass, comprising a pair of feed-in rollers, a gang of pairs of intermeshing non-contacting toothed crushing rollers in operative delivery alignment therewith, said crushing rollers having the tooth pitches progressively reduced towards one end of the series thereof, a pair of continuous flexible belts in operative alignment with said toothed rollers, belt pulley rollers over which said belts pass and by which they are driven, means for driving both the crushing rollers and the belt pulley rollers, said means rotating the belt pulley rollers at slightly different peripheral speeds, and means for applying reciprocating movement to one of said belts across the direction of its movement.

3. Apparatus for decorticating ramie grass, comprising a pair of feed-in rollers, a gang of pairs of intermeshing non-contacting toothed crushing rollers in operative delivery alignment therewith, said crushing rollers having the tooth pitches progressively reduced towards one end of the series thereof, a pair of continuous flexible belts in operative alignment with said toothed rollers, means for driving all said rollers and said belts, in such manner that the crushing rollers and the lower one of the two belts have the same linear speed while the upper belt has a slightly higher linear speed, to impart a chafing or rubbing action on the grass stems passing through the rollers.

4. In decorticating apparatus, having rollers therein for crushing the surface of the fibrous plants undergoing treatment, means for removing the crushed surface material, comprising a pair of endless belts, so disposed that adjacent working surfaces of the two belts lie closely adjacent each other and travel in the same direction, means for imparting a clapping motion to the working surface of one said belt, in a direction perpendicular to the direction of movement of the belt, means for reciprocating one said belt to a slight extent transversely of its direction of movement, and means for driving said belts in such manner that one said belt moves at a slightly higher speed than the other, so as to impart a chafing, abrasive, and multiple-blow action simultaneously to the crushed surface material of the fibrous plants, to remove the same.

5. In decorticating apparatus, a pair of endless belts, a drive shaft, means driven by said drive shaft for driving said belts, the belts being disposed so that their adjacent working surfaces lie closely spaced from each other a substantially uniform distance throughout their entire working extent and travel in the same direction, tensioning means disposed below the working surface of the under belt and resiliently pressing upwardly thereagainst, to compensate for sag in the belt and to maintain uniform the said spacing between the belts, a roller disposed immediately back of the working surface of one belt, and in contact therewith, a shaft on which said roller is eccentrically mounted, and means for driving said last-mentioned shaft from said drive shaft, to cause said roller to impart a clapping action to said belt.

6. In decorticating apparatus for fibrous plants, a frame, a pair of continuous flexible belts mounted in said frame, one overlying the other, a power source, means including pulleys for driving said belts from said power source in such manner that the adjacent surfaces of said belts travel in the same direction, a gear wheel on the shaft of one said pulley, a second gear wheel meshing with the first said gear wheel and having a cranked lever thereon, means for slot-fulcruming said lever in said frame, a collar axially fast but rotatably loose on the shaft of the corresponding pulley of the other belt, and having a projecting stud thereon, and a fork on said lever, straddling said stud, and reciprocating the shaft carrying said collar transversely of said belt, upon rotation of said shaft.

7. In decorticating apparatus, a pair of endless belts, a drive shaft, a power source for driving the shaft, means driven by said drive shaft for driving said belts, the belts being so disposed that adjacent working surfaces of the two belts lie closely spaced from each other and travel in the same direction, a cam disposed immediately back of the working surface of one said belt and in contact therewith, a shaft on which said cam is eccentrically mounted, and means for driving said last-mentioned shaft from said power source, so that a positive clapping motion is imparted to said belt.

8. In decorticating apparatus for the treatment of fibrous material, a frame, a plurality of pairs of longitudinally corrugated rollers disposed crosswise along the length of said frame, the rollers of each pair being disposed one above the other, means for rotating said rollers at a uniform peripheral speed, the rollers of each pair meshing so that the teeth formed by the corrugations will extend into the valleys between adjacent teeth of the other roller to points just short of the bottoms of said valleys, the pitch of the teeth of the said pairs of rollers diminishing from one pair to another in the direction of the outlet end of said pairs of rollers, whereby the surface of the fibrous material is crushed and is subjected to an increasing bending action as it passes through the pairs of crushing rollers from the inlet to the rollers, to the outlet thereof, to loosen the surface material from the fibers.

9. In decorticating apparatus for the treatment of fibrous materials, a plurality of pairs of longitudinally corrugated rollers, disposed crosswise along the length of said frame, the rollers of each pair being disposed one above the other, means for rotating said rollers, the rollers of each pair meshing so that the teeth formed by the corrugations will extend into the valleys between adjacent teeth of the other rollers to points just short of the bottoms of said valleys, the minimum clearance between the teeth of one roller and the corresponding valleys between the teeth of the adjacent rollers having a fixed value for all pairs of rollers, the pitch of said teeth, however. diminishing from one pair of rollers to another in the direction of the outlet end of said pairs of rollers, whereby the surface of the fibrous material is crushed to a uniform extent, and at the same time is subjected to an increasing bending action as it passes from the inlet to the outlet of said pairs of rollers, to loosen the surface material from the fibers.

BALDA NICHOLAS.